United States Patent
Saxena et al.

(10) Patent No.: US 10,718,744 B2
(45) Date of Patent: Jul. 21, 2020

(54) PRE-PACKED, SEALED RADIAL FLOW CHROMATOGRAPHY COLUMN

(71) Applicant: Sepragen Corporation, Hayward, CA (US)

(72) Inventors: Renu Saxena, Pleasanton, CA (US); David Zuffi, Rohnert Park, CA (US); Vinit Saxena, Pleasanton, CA (US)

(73) Assignee: Sepragen Corporation, Hayward, CA (US)

( * ) Notice: Subject to any disclaimer, the term of this patent is extended or adjusted under 35 U.S.C. 154(b) by 298 days.

(21) Appl. No.: 15/336,619

(22) Filed: Oct. 27, 2016

(65) Prior Publication Data

US 2018/0120270 A1    May 3, 2018

(51) Int. Cl.
*B01D 15/14* (2006.01)
*B01D 15/18* (2006.01)
(Continued)

(52) U.S. Cl.
CPC ......... *G01N 30/6091* (2013.01); *B01D 15/14* (2013.01); *B01D 15/18* (2013.01); *B01D 15/1842* (2013.01); *B01D 15/206* (2013.01); *B01D 15/22* (2013.01); *B01D 15/322* (2013.01); *B01D 15/325* (2013.01);
(Continued)

(58) Field of Classification Search
CPC ........ G01N 30/38; G01N 30/90; G01N 30/92; G01N 30/94; G01N 30/6004; G01N 30/606; G01N 30/6026; G01N 30/6091; G01N 2030/386; G01N 2030/522; G01N 2030/906; G01N 2030/565; B01D 15/14; B01D 15/1807; B01D 15/185; B01D 15/1885; B01D 15/18; B01D 15/40; B01D 15/22; B01D 15/206; B01D 15/3804; B01D 15/325; B01D 15/361; B01D 15/322; B01D 53/0431; B01D 53/06; B01D 53/0462; B01D 53/047; B01D 15/1842; C07C 7/12; C07C 15/08
See application file for complete search history.

(56) References Cited

U.S. PATENT DOCUMENTS

| 4,676,898 A | 6/1987 | Saxena |
| 5,423,982 A * | 6/1995 | Jungbauer ............ B01D 15/14 |
| | | 210/198.2 |

(Continued)

*Primary Examiner* — Benjamin L Lebron
(74) *Attorney, Agent, or Firm* — Rutan & Tucker, LLP

(57) ABSTRACT

Provided herein in some embodiments is a column including a housing assembly and a cartridge assembly. The housing assembly can include a housing top, a housing bottom, and a housing siding. The housing siding can be fixedly coupled to the housing top and the housing bottom forming hermetic seals therebetween. The cartridge assembly can include a cartridge top, an outer frit, and an inner frit disposed within the outer frit. A toroidal space can defined by the cartridge top, the outer frit, the inner frit, and the housing bottom. The toroidal space can be configured to hold a stationary phase for radial flow column chromatography. Also provided herein in some embodiments is a process including assembling the cartridge assembly, assembling the housing assembly about the cartridge assembly, and pressure testing the column. In some embodiments, the process can further include charging the toroidal space with a stationary phase.

8 Claims, 9 Drawing Sheets

Figure 1:
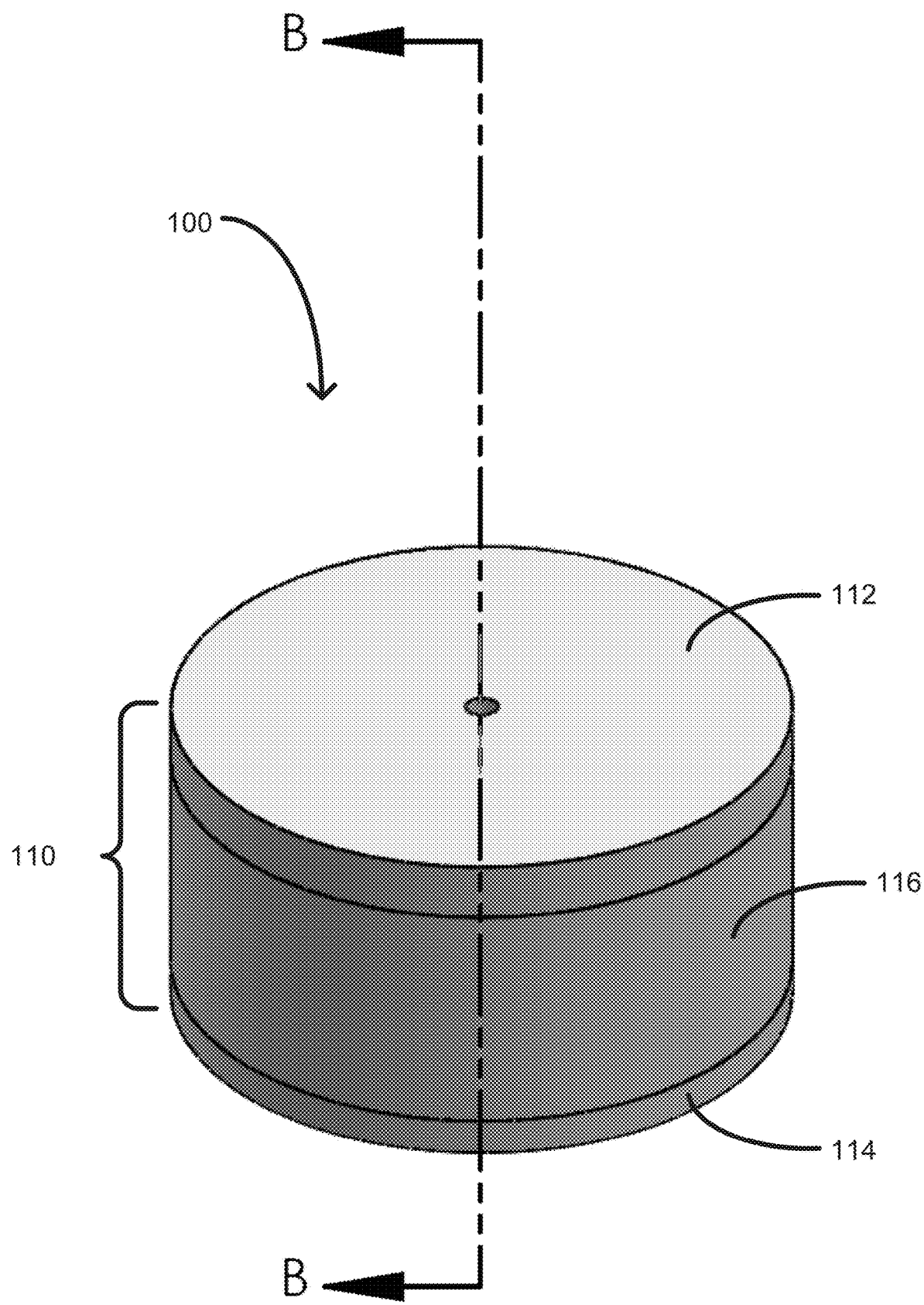

(51) Int. Cl.
    *B01D 15/20*       (2006.01)
    *B01D 15/22*       (2006.01)
    *B01D 15/32*       (2006.01)
    *B01D 15/36*       (2006.01)
    *B01D 15/38*       (2006.01)
    *G01N 30/38*       (2006.01)
    *G01N 30/60*       (2006.01)
    *G01N 30/56*       (2006.01)

(52) U.S. Cl.
    CPC ....... *B01D 15/361* (2013.01); *B01D 15/3804* (2013.01); *G01N 30/38* (2013.01); *G01N 30/606* (2013.01); *G01N 30/6026* (2013.01); *G01N 2030/386* (2013.01); *G01N 2030/565* (2013.01)

(56) References Cited

U.S. PATENT DOCUMENTS

| | | | |
|---|---|---|---|
| 5,597,489 A | 1/1997 | Schneider et al. | |
| 6,096,870 A | 8/2000 | Mozaffar et al. | |
| 7,351,332 B2 * | 4/2008 | DeMarco | B01D 15/22 |
| | | | 156/73.5 |
| 8,685,241 B1 | 4/2014 | Saxena et al. | |

\* cited by examiner

PRE-PACKED, SEALED RADIAL FLOW CHROMATOGRAPHY COLUMN

FIELD

Devices and methods provided herein generally relate to radial flow column chromatography.

BACKGROUND

Chromatography is a technique for separating one or more components from a multi-component mixture using a two-phase separation system. In column chromatography, the two-phase separation system includes an adsorbent or a stationary phase as the first phase and an eluent or a mobile phase as the second phase. A multi-component mixture can be loaded onto the stationary phase in one part of a column, and a mobile phase can be passed through the stationary phase to separately elute the one or more components from another part of the column in accordance with differential partitioning of the one or more components between the stationary phase and the mobile phase. However, charging and packing a column with the stationary phase can be time and labor intensive for a chromatographer. Furthermore, chromatographer variability in charging and packing a column can lead to inconsistent chromatographic results. Provided herein are devices and methods that address the foregoing.

SUMMARY

Provided herein in some embodiments is a column including a housing assembly and a cartridge assembly. The housing assembly can include a housing top, a housing bottom, and a housing siding. The housing siding can be fixedly coupled to the housing top and the housing bottom forming hermetic seals therebetween. The cartridge assembly can include a cartridge top, an outer frit, and an inner frit disposed within the outer frit. A toroidal space can defined by the cartridge top, the outer frit, the inner frit, and the housing bottom. The toroidal space can be configured to hold a stationary phase for radial flow column chromatography.

Also provided herein in some embodiments is a process including assembling the cartridge assembly, assembling the housing assembly about the cartridge assembly, and pressure testing the column. In some embodiments, the process can further include charging the toroidal space with a stationary phase.

These and other features of the devices and methods provided herein can be better understood with reference to the drawings, description, and claims, all of which form the disclosure of this patent application.

DRAWINGS

The drawings refer to some embodiments of the devices and methods provided herein in which:

FIG. 1 provides a schematic illustrating a fully assembled column in accordance with some embodiments.

Figure 2:
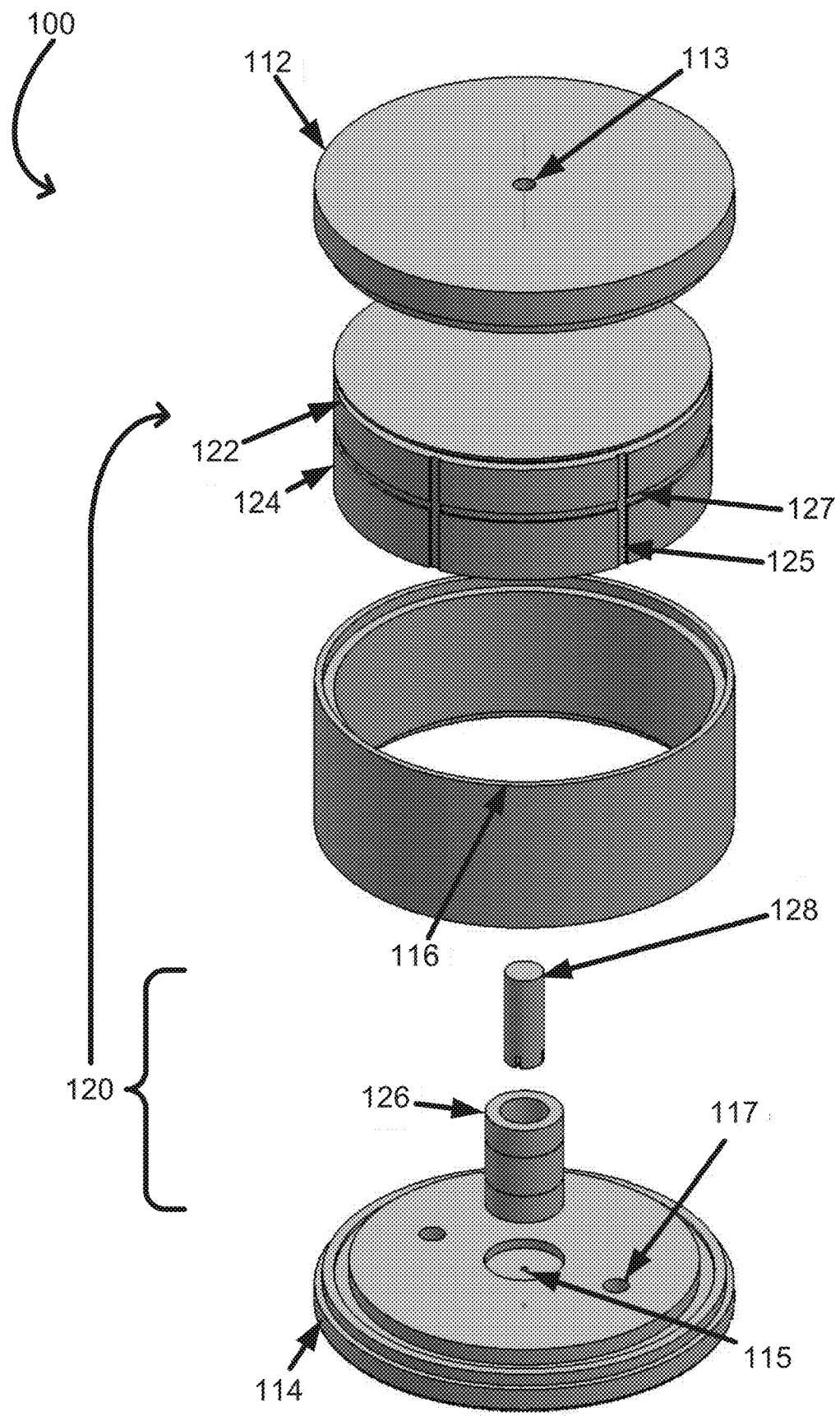

FIG. 2 provides a schematic illustrating an exploded view of the column in accordance with some embodiments.

Figure 3:
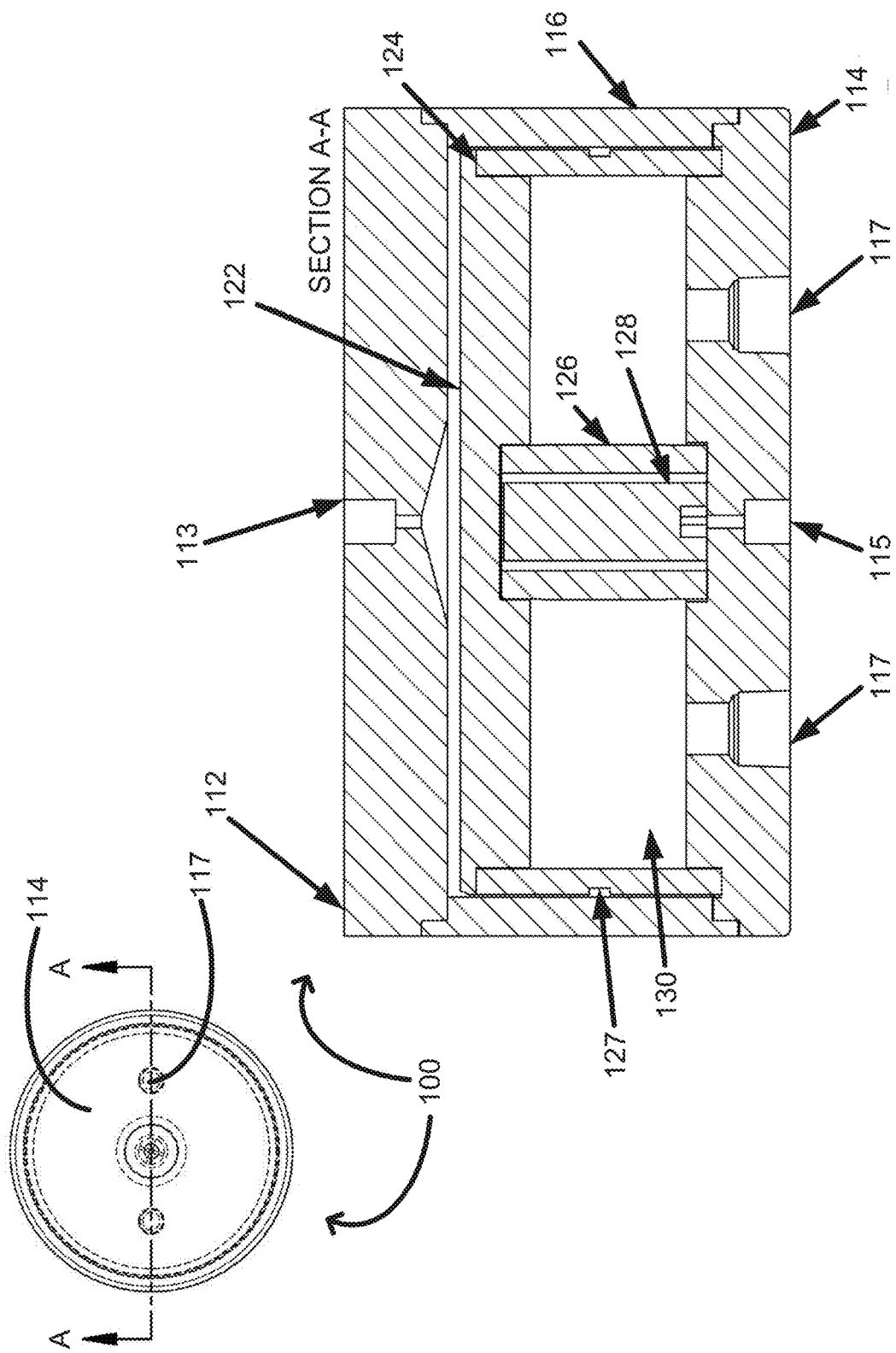

FIG. 3 provides a schematic illustrating a first cross sectional view of the column in accordance with some embodiments.

Figure 4:
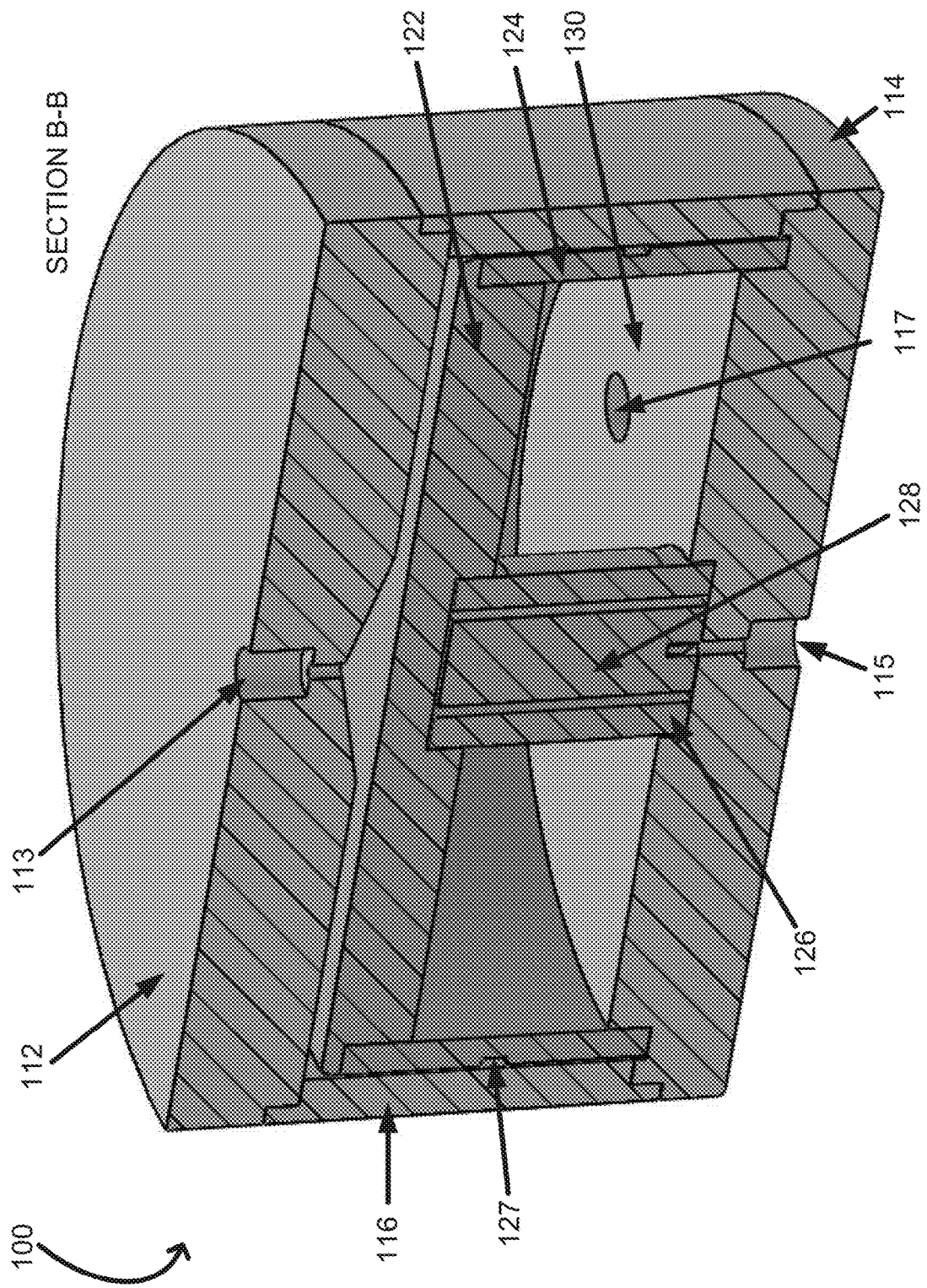

FIG. 4 provides a schematic illustrating a second cross sectional view of the column in accordance with some embodiments.

Figure 5:
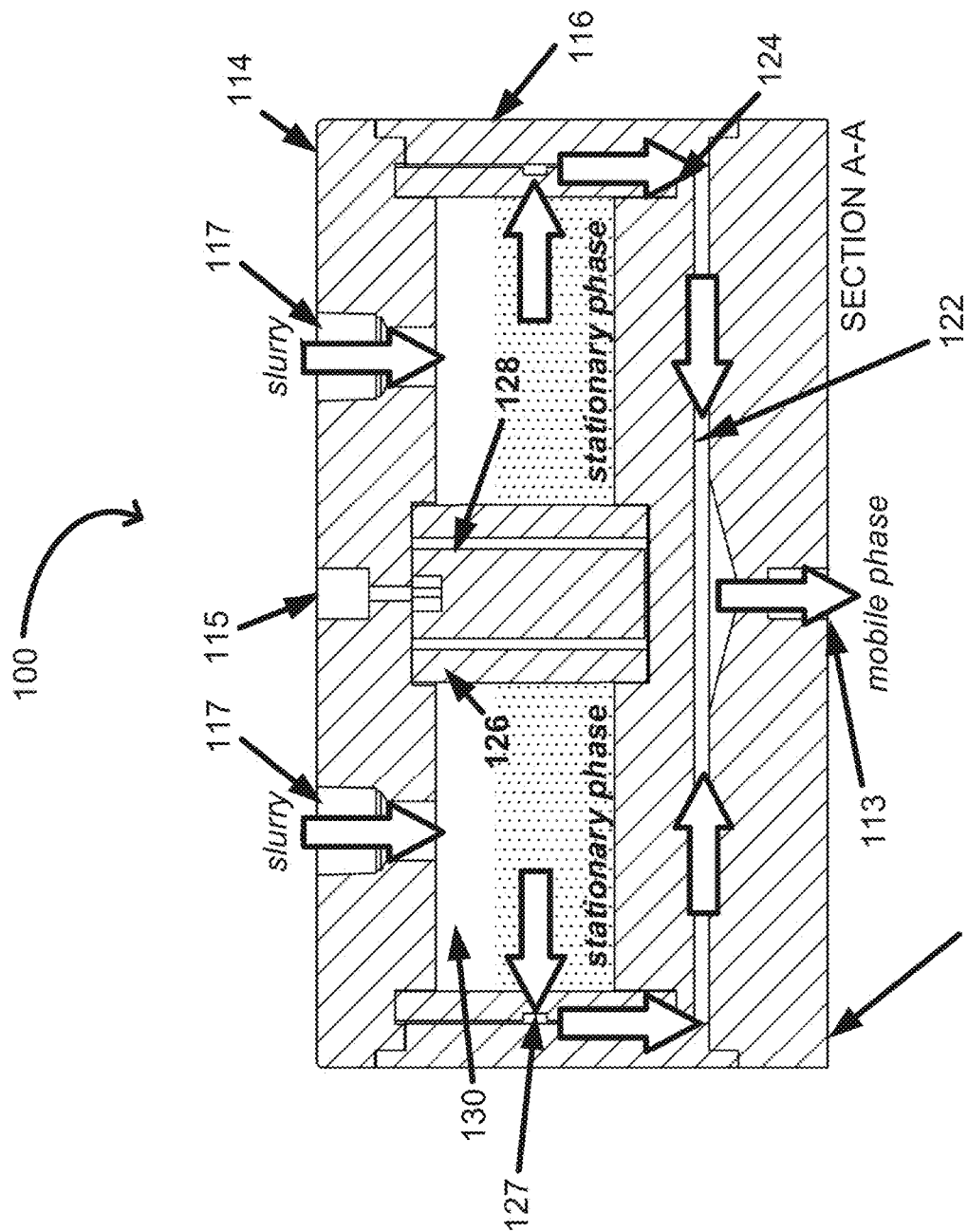

FIG. 5 provides a schematic illustrating the first cross sectional view of the column while charging the column with a stationary phase in accordance with some embodiments.

Figure 6:
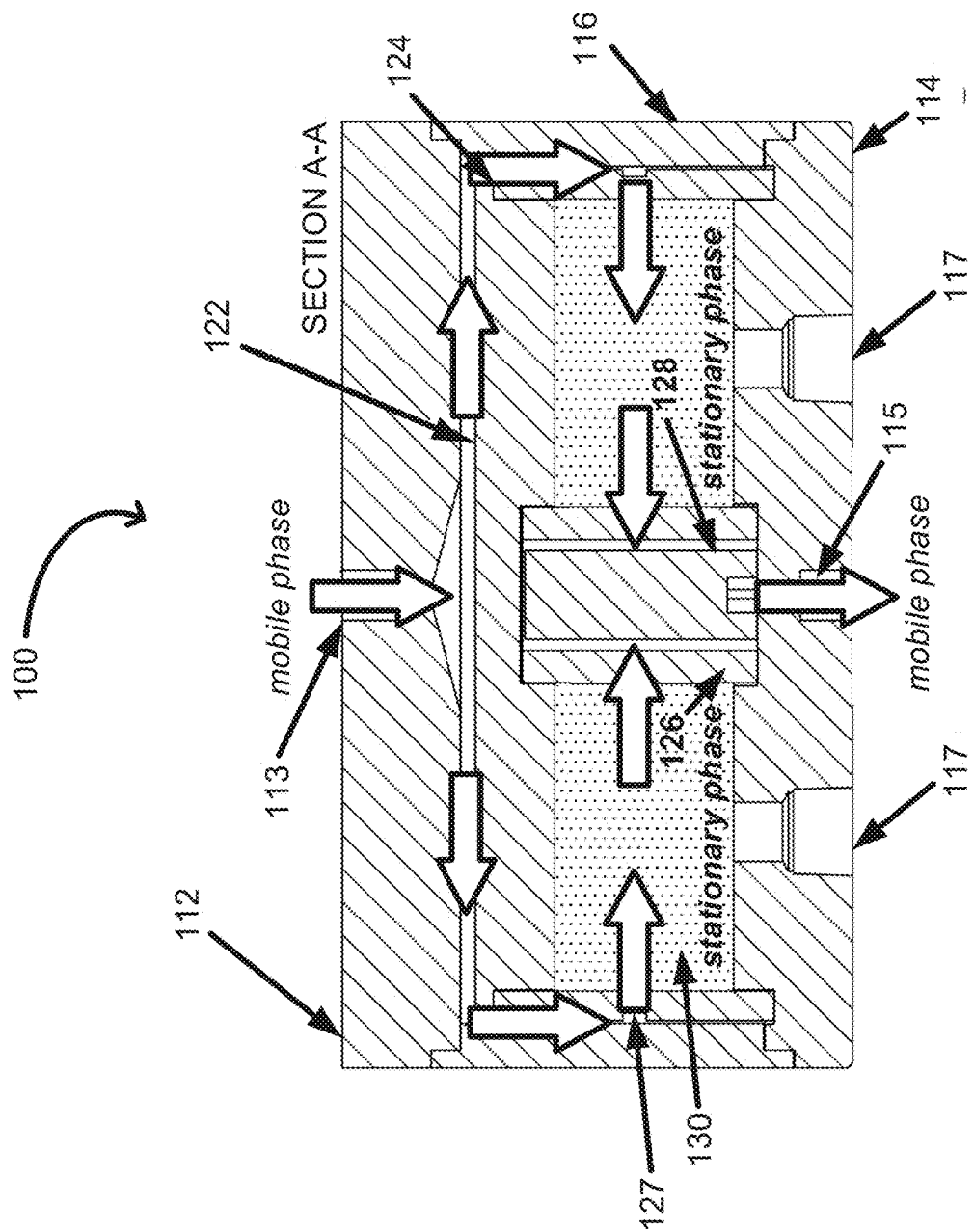

FIG. 6 provides a schematic illustrating the first cross sectional view of the column during radial flow column chromatography in accordance with some embodiments.

Figure 7A:
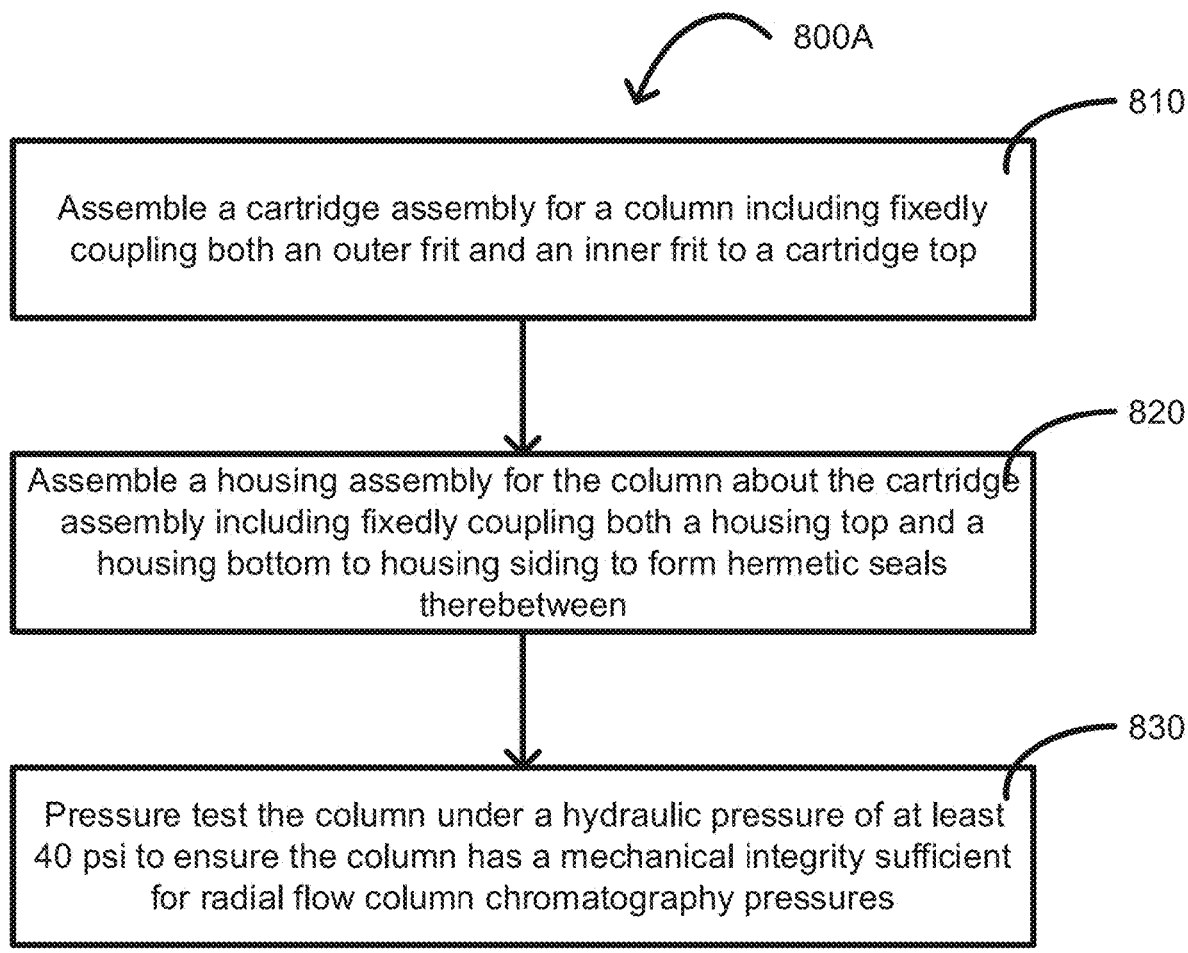

FIG. 7A provides a flow chart for assembling a column in accordance with some embodiments.

Figure 7B:
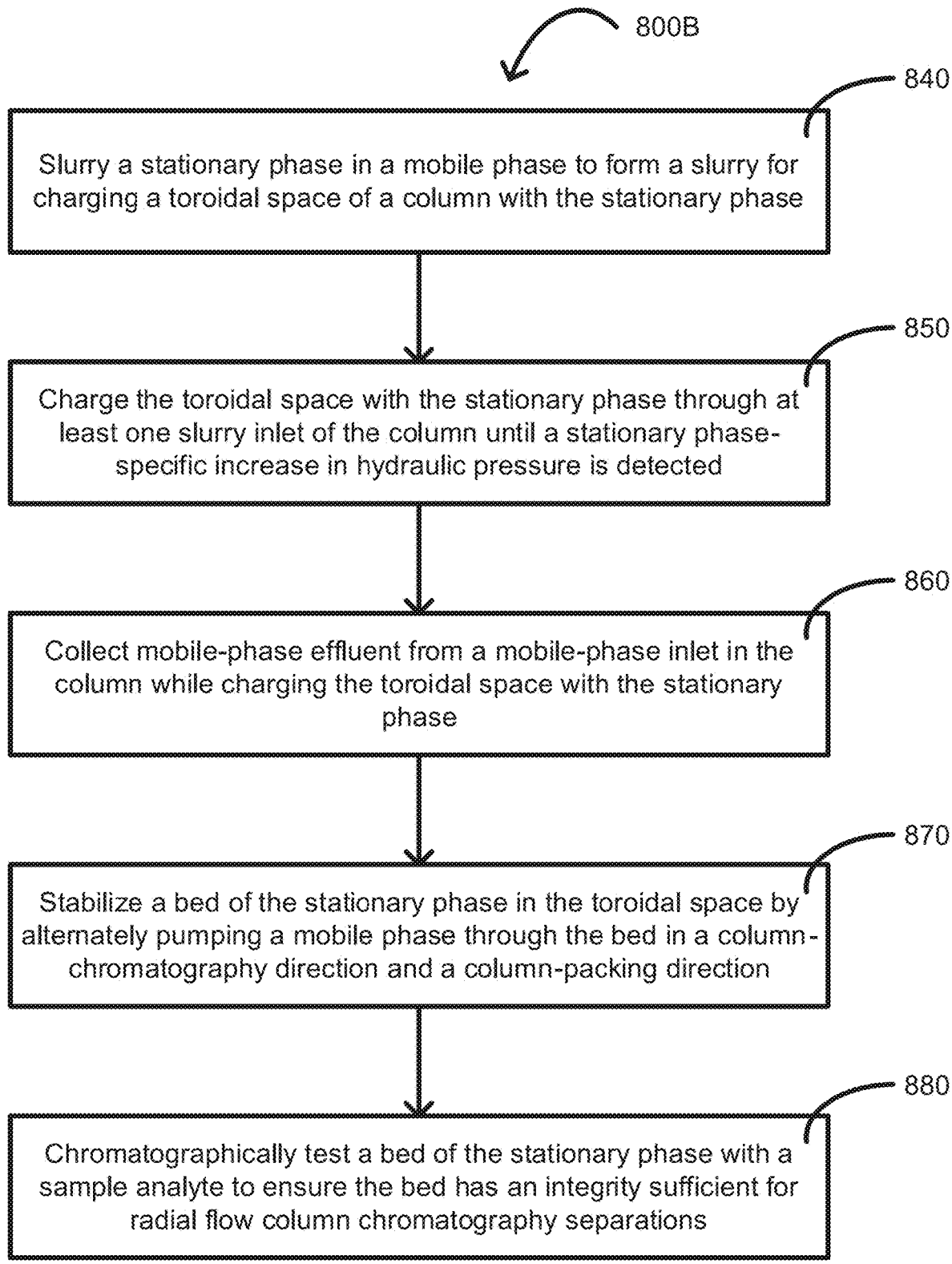

FIG. 7B provides a flow chart for charging a column with a stationary phase in accordance with some embodiments.

Figure 8:
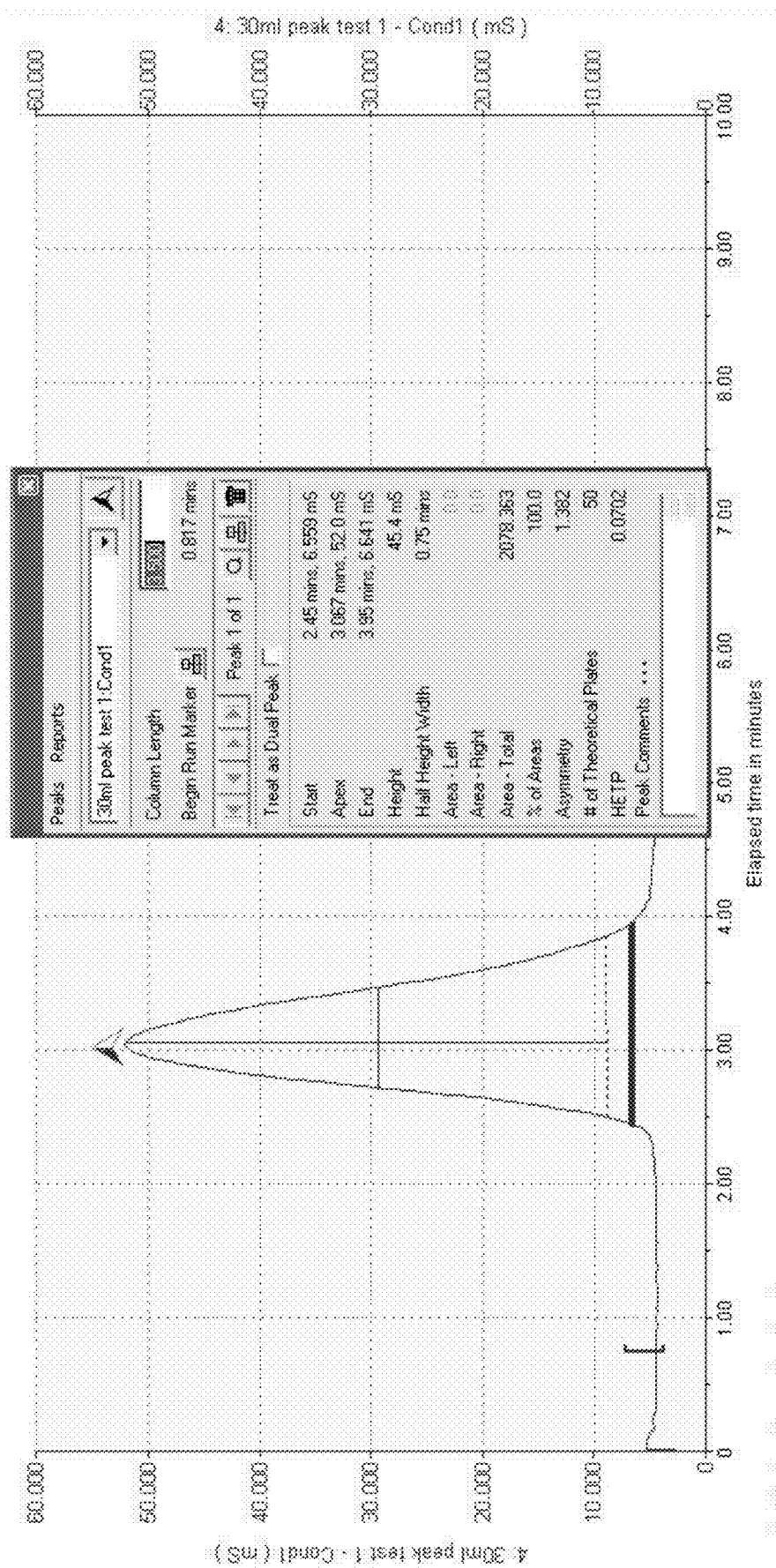

FIG. 8 provides a chromatogram for a chromatographic test of a column in accordance with some embodiments.

While the devices and methods are subject to various modifications, equivalents, and alternative forms, specific embodiments thereof have been shown by way of example in the drawings and are described in detail below. It should be understood that the devices and methods are not limited to the particular embodiments disclosed, but—on the contrary—the intention is to cover all modifications, equivalents, and alternative forms using the specific embodiments.

DESCRIPTION

In the following description, numerous specific details are set forth in order to provide a thorough understanding of the devices and methods. It will be apparent, however, to a person having ordinary skill in the art that the devices and methods can be practiced without some of these specific details. In some instances, a block diagram can be used in order to avoid unnecessarily obscuring the devices and methods provided herein. Further, specific numeric references such as first component, a second component, and so on can be made. However, the specific numeric reference should not be interpreted as a literal sequential order but rather interpreted that the first component is different than a second component. Thus, the specific details set forth are merely examples. The specific details can be varied from and still be within the spirit and scope of the concepts provided herein. The term "coupled," as in the first component is coupled to the second component, includes a direct connection between the first component and the second component or an indirect connection through an intervening component.

Pressure is expressed as gauge pressure unless indicated otherwise.

A column-chromatography direction includes a direction through a column from a mobile-phase inlet of the column to a mobile phase outlet of the column, which is in accordance with a chromatographic separation. A column-packing direction includes a direction through the column that is opposite in direction of the column-chromatography direction.

Unless defined otherwise, all technical and scientific terms used herein have the same meaning as commonly understood by persons of ordinary skill in the art.

Chromatography is a technique for separating one or more components from a multi-component mixture using a two-phase separation system. In column chromatography, the two-phase separation system includes an adsorbent or a stationary phase as the first phase and an eluent or a mobile phase as the second phase. A multi-component mixture can be loaded onto the stationary phase in one part of a column, and a mobile phase can be passed through the stationary phase to separately elute the one or more components from another part of the column in accordance with differential partitioning of the one or more components between the stationary phase and the mobile phase. However, charging and packing a column with the stationary phase can be time and labor intensive for a chromatographer. Furthermore, chromatographer variability in charging and packing a column can lead to inconsistent chromatographic results. Provided herein are devices and methods that address the foregoing.

Provided herein in some embodiments, for example, is a column including a housing assembly and a cartridge assembly. The housing assembly can include a housing top, a housing bottom, and a housing siding. The housing siding can be fixedly coupled to the housing top and the housing bottom forming hermetic seals therebetween. The cartridge assembly can include a cartridge top, an outer frit, and an inner frit disposed within the outer frit. A toroidal space can defined by the cartridge top, the outer frit, the inner frit, and the housing bottom. The toroidal space can be configured to hold a stationary phase for radial flow column chromatography.

Also provided herein in some embodiments, for example, is a process including assembling the cartridge assembly, assembling the housing assembly about the cartridge assembly, and pressure testing the column. In some embodiments, the process can further include charging the toroidal space with a stationary phase.

As shown in FIGS. 1-6, a device such as column 100 can include a housing assembly 110 and a cartridge assembly 120. The housing assembly can include housing assembly components including a housing top 112, a housing bottom 114, and a housing siding 116. The housing top 112 can include a mobile-phase inlet 113. The housing bottom 114 can include a mobile-phase outlet 115 and one or more slurry inlets 117. The cartridge assembly 120 can include cartridge assembly components including a cartridge top 122, an outer frit 124, an inner frit 126 disposed within the outer frit 124, and a collector 128 such as a collector rod disposed within the inner frit 126. A toroidal space 130 of the column 100 can be defined by the cartridge top 122, the outer frit 124, the inner frit 126, and the housing bottom 114.

The column 100 can include a central axis, and the column 100 can be dimensioned with a diameter (or a radius) and a height suitable for column chromatography at a scale ranging from milliliters to kiloliters of mobile phase at accepted ratios (e.g., 20:1 to 100:1) of stationary phase to multi-component mixture for separation. For radial flow column chromatography, the column 100 can be generally dimensioned such that the diameter is greater than the height. This provides a greater number of partitioning interactions for components of a multi-component mixture when pushed through a stationary phase of the column 100 by a mobile phase in a radial direction of the column 100.

The column 100 can tolerate a hydraulic pressure of at least 10 psi, including at least 20 psi, such as at least 30 psi, for example, at least 40 psi without adverse effects such as mechanical failure of the column 100. In some embodiments, for example, the column 100 can tolerate a hydraulic pressure of at least 50 psi without adverse effects such as mechanical failure of the column 100.

The column 100 can be primarily formed of one or more biocompatible materials having low leachability. As such, the column 100 can be formed of a metal such as stainless steel; a polymer such as poly(methyl methacrylate), polycarbonate, polyethylene, or polypropylene; or a combination thereof. In some embodiments, the column 100 as a whole can be primarily formed of a metal such as stainless steel or a polymer such as poly(methyl methacrylate), polycarbonate, polyethylene, or polypropylene. In some embodiments, a part of the column 100 such as the housing assembly 110, the cartridge assembly 120, or one or more components thereof can be individually and primarily formed of a metal such as stainless steel, a polymer such as poly(methyl methacrylate), polycarbonate, polyethylene, or polypropylene, or a combination thereof. "Primarily formed" is intended to include a bulk material of the column 100, the housing assembly 110, the cartridge assembly 120, or the one or more components thereof excluding filler metals in welds, adjoining adhesives, and the like.

The housing assembly 110 can include housing assembly components including a housing top 112, a housing bottom 114, and a housing siding 116. Each of the housing top 112 and the housing bottom 114 can be configured to mate with the housing siding 116, and the housing siding 116, in turn, can be configured to mate with both the housing top 112 and the housing bottom 114. Any joint of a number of joints can be used to mate a pair of housing assembly components such as the housing top 112 and the housing siding 116 or the housing bottom 114 and the housing siding 116. For example, a butt-type joint can be used to mate any pair of housing assembly components; however, an increased mating-surface surface area can be used to better effect when mating and fixedly coupling the housing assembly components. To this end, a circumferential groove can be used in at least one housing assembly component of a pair of housing assembly components to mate the pair of housing assembly components with, for example, a rabbet-type joint. Further to this end, a circumferential groove can be used in both housing assembly components of a pair of housing assembly components to mate the pair of housing assembly components with, for example, a lap-type joint. For example, the housing top 112 can be configured with a circumferential groove at an outer circumference of its housing siding-mating surface, and the housing siding 116 can be configured with a circumferential groove at an inner circumference of its housing top-mating surface. Thereby, as shown, the housing top 112 and the housing siding 116 can mate with a lap-type joint therebetween. Likewise, the housing bottom 114 can be configured with a circumferential groove at an outer circumference of its housing siding-mating surface, and the housing siding 116 can be configured with a circumferential groove at an inner circumference of its housing bottom-mating surface. Thereby, as shown, the housing bottom 114 and the housing siding 116 can mate with a lap-type joint therebetween.

An engineering fit selected from a clearance or loose fit, a transition or light interference fit, and an interference fit can be used to mate a pair of housing assembly components such as the housing top 112 and the housing siding 116 or the housing bottom 114 and the housing siding 116. For example, as shown, the housing top 112 and the housing siding 116 can mate with a lap-type joint therebetween; the lap-type joint can have a clearance fit, a transition fit, or an interference fit. Likewise, as shown, the housing bottom 114 and the housing siding 116 can mate with a lap-type joint therebetween; the lap-type joint can have a clearance fit, a transition fit, or an interference fit.

An interference fit can be used to mate a pair of housing assembly components such as the housing top 112 and the housing siding 116 or the housing bottom 114 and the housing siding 116. The interference fit can be formed by inserting one housing assembly component into another housing assembly component using force, a thermal means such as thermal expansion or contraction, or a combination thereof. The interference fit can fixedly couple one housing assembly component to another housing assembly component forming a hermetic seal therebetween. For example, an interference fit can fixedly couple the housing top 112 and the housing siding 116 forming a hermetic seal therebetween. Likewise, an interference fit can fixedly couple the housing bottom 114 and the housing siding 116 forming a hermetic seal therebetween. Additional sealing means need not be used; however, welding, adhesive bonding, or solvent bonding can additionally be used if desired.

A clearance fit or a transition fit can be used to mate a pair of housing assembly components such as the housing top 112 and the housing siding 116 or the housing bottom 114 and the housing siding 116. The clearance fit can be formed by inserting one housing assembly component into another housing assembly component. The transition fit can likewise be formed optionally additionally using force, a thermal means such as thermal expansion or contraction, or a combination thereof. The clearance fit and the transition fit in conjunction with a sealing means such as welding, adhesive bonding, or solvent bonding, can fixedly couple one housing assembly component to another housing assembly component forming a hermetic seal therebetween. For example, a clearance fit or a transition fit in conjunction with a sealing means can fixedly couple the housing top 112 and the housing siding 116 forming a hermetic seal therebetween. Likewise, a clearance fit or a transition fit in conjunction with a sealing means can fixedly couple the housing bottom 114 and the housing siding 116 forming a hermetic seal therebetween.

The hermetic seals of the housing assembly 110 are not formed by mechanical compression with hardware fasteners and gaskets such as O-rings. This is advantageous because, for example, O-rings are both expensive to mold and machine for, and the O-rings themselves need to be exchanged due to wear and tear.

The hermetic seals of the housing assembly 110 can be characteristic of the manner in which the hermetic seals are formed. As such, the hermetic seals can be characteristic of welding, adhesive bonding, solvent bonding, interference fitting, or a combination thereof. At least one characteristic of welding includes, for example, presence of an autogenous, homogeneous, or heterogeneous weld and a heat-affected zone about the weld. At least one characteristic of adhesive bonding includes, for example, presence of an adhesive-based bond including a dried and/or cured adhesive. The adhesive can be an FDA-compliant adhesive, and the adhesive can include Dow Corning® 732 Multi-Purpose Sealant, 700 Industrial Grade Silicone Sealant, or 748 Non-Corrosive Sealant; Momentive® RTV108; or a Factor II RTV. At least one characteristic of solvent bonding includes, for example, presence of a bond including material from either one or both components coupled by the bond. At least one characteristic of interference fitting includes, for example, lack of a weld and a heat-affected zone about the weld, an adhesive-based bond, and a bond including material from either one or both components coupled by the bond.

The housing assembly 110 including the hermetic seals thereof can tolerate a hydraulic pressure of at least 10 psi, including at least 20 psi, such as at least 30 psi, for example, at least 40 psi without adverse effects such as mechanical failure of the housing assembly 110. In some embodiments, for example, the housing assembly 110 can tolerate a hydraulic pressure of at least 50 psi without adverse effects such as mechanical failure of the housing assembly 110.

The housing assembly 110 can be primarily formed of one or more biocompatible materials having low leachability. As such, the housing assembly 110 can be formed of a metal such as stainless steel; a polymer such as poly(methyl methacrylate), polycarbonate, polyethylene, or polypropylene; or a combination thereof. In some embodiments, the housing assembly 110 as a whole can be primarily formed of a metal such as stainless steel or a polymer such as poly (methyl methacrylate), polycarbonate, polyethylene, or polypropylene. In some embodiments, one or more components of the housing assembly 110 such as the housing top 112, the housing bottom 114, and the housing siding 116 can be individually and primarily formed of a metal such as stainless steel, a polymer such as poly(methyl methacrylate), polycarbonate, polyethylene, or polypropylene, or a combination thereof.

The cartridge assembly 120 can include cartridge assembly components including a cartridge top 122, an outer frit 124, an inner frit 126, and a collector 128 such as a collector rod. Each of the outer frit 124 and the inner frit 126 can be configured to mate with the cartridge top 122, and the cartridge top 122, in turn, can be configured to mate with both the outer frit 124 and the inner frit 126. Any joint of a number of joints can be used to mate a pair of cartridge assembly components such as the cartridge top 122 and the outer frit 124 or the cartridge top 122 and the inner frit 126. For example, a butt-type joint can be used to mate any pair of cartridge assembly components; however, an increased mating-surface surface area can be used to better effect when mating and fixedly coupling the cartridge assembly components. To this end, a circumferential groove can be used in at least one cartridge assembly component of a pair of cartridge assembly components to mate the pair of cartridge assembly components with, for example, a rabbet-type joint. For example, the cartridge top 122 can be configured with a circumferential groove at an outer circumference of its outer frit-mating surface. Thereby, as shown, the cartridge top 122 and the outer frit 124 can mate with a rabbet-type joint therebetween. Likewise, the cartridge top 122 can be configured with a circumferential groove or a disk-shaped depression at an inner circumference of its inner frit-mating surface. Thereby, as shown, the cartridge top 122 and the inner frit 126 can mate with a rabbet-type joint therebetween. Further to this end, a circumferential groove can be used in both cartridge assembly components of a pair of cartridge assembly components to mate the pair of cartridge assembly components with, for example, a lap-type joint.

An engineering fit selected from a clearance fit, a transition fit, and an interference fit can be used to mate a pair of cartridge assembly components such as the cartridge top 122 and the outer frit 124 or the cartridge top 122 and the inner frit 126. For example, as shown, the cartridge top 122 and the outer frit 124 can mate with a rabbet-type joint therebetween; the rabbet-type joint can have a clearance fit, a transition fit, or an interference fit. Likewise, as shown, the cartridge top 122 and the inner frit 126 can mate with a rabbet-type joint therebetween; the rabbet-type joint can have a clearance fit, a transition fit, or an interference fit.

An interference fit can be used to mate a pair of cartridge assembly components such as the cartridge top 122 and the outer frit 124 or the cartridge top 122 and the inner frit 126. The interference fit can be formed by inserting one cartridge assembly component into another cartridge assembly component using force, a thermal means such as thermal expansion or contraction, or a combination thereof. The interference fit can fixedly couple one cartridge assembly component to another cartridge assembly component optionally forming a hermetic seal therebetween. For example, an interference fit can fixedly couple the cartridge top 122 and the outer frit 124 optionally forming a hermetic seal therebetween. Likewise, an interference fit can fixedly couple the cartridge top 122 and the inner frit 126 optionally forming a hermetic seal therebetween. Additional sealing means need not be used; however, welding, adhesive bonding, or solvent bonding can additionally be used if desired.

Optionally, the outer frit 124 and the inner frit 126 of the cartridge assembly 120 can be fixedly coupled to the housing bottom 114 of the housing assembly 110 with a butt-, rabbet-, or lap-type joint therebetween having an interference fit. Additional sealing means need not be used; however, welding, adhesive bonding, or solvent bonding can additionally be used if desired.

A clearance fit or a transition fit can be used to mate a pair of cartridge assembly components such as the cartridge top 122 and the outer frit 124 or the cartridge top 122 and the inner frit 126. The clearance fit can be formed by inserting one cartridge assembly component into another cartridge assembly component. The transition fit can likewise be formed optionally additionally using force, a thermal means such as thermal expansion or contraction, or a combination thereof. The clearance fit and the transition fit in conjunction with a sealing means such as welding, adhesive bonding, or solvent bonding, can fixedly couple one cartridge assembly component to another cartridge assembly component optionally forming a hermetic seal therebetween. For example, a clearance fit or a transition fit in conjunction with a sealing means can fixedly couple the cartridge top 122 and the outer frit 124 optionally forming a hermetic seal therebetween. Likewise, a clearance fit or a transition fit in conjunction with a sealing means can fixedly couple the cartridge top 122 and the inner frit 126 optionally forming a hermetic seal therebetween.

Optionally, the outer frit 124 and the inner frit 126 of the cartridge assembly 120 can be fixedly coupled to the housing bottom 114 of the housing assembly 110 with a butt-, rabbet-, or lap-type joint therebetween having a clearance or transition fit. The clearance fit and the transition fit in conjunction with a sealing means such as welding, adhesive bonding, or solvent bonding, can fixedly couple the outer frit 124 and the inner frit 126 of the cartridge assembly 120 to the housing bottom 114 of the housing assembly 110 optionally forming a hermetic seal therebetween.

The seals of the cartridge assembly 120 are not formed by mechanical compression with hardware fasteners and gaskets such as O-rings. This is advantageous because, for example, O-rings are both expensive to mold and machine for, and the O-rings themselves need to be exchanged due to wear and tear.

The seals of the cartridge assembly 120 can be characteristic of the manner in which the seals are formed. As such, the seals can be characteristic of welding, adhesive bonding, solvent bonding, interference fitting, or a combination thereof.

The cartridge assembly 120 including the seals thereof can tolerate a hydraulic pressure of at least 10 psi, including at least 20 psi, such as at least 30 psi, for example, at least 40 psi without adverse effects such as mechanical failure of the cartridge assembly 120. In some embodiments, for example, the cartridge assembly 120 can tolerate a hydraulic pressure of at least 50 psi without adverse effects such as mechanical failure of the cartridge assembly 120.

The cartridge assembly 120 can be primarily formed of one or more biocompatible materials having low leachability. As such, the cartridge assembly 120 can be formed of a metal such as stainless steel; a polymer such as poly(methyl methacrylate), polycarbonate, polyethylene, or polypropylene; or a combination thereof. In some embodiments, the cartridge assembly 120 as a whole can be primarily formed of a metal such as stainless steel or a polymer such as poly(methyl methacrylate), polycarbonate, polyethylene, or polypropylene. In some embodiments, one or more components of the cartridge assembly 120 such as the cartridge top 122, the outer frit 124, the inner frit 126, and the collector 128 can be individually and primarily formed of a metal such as stainless steel, a polymer such as poly(methyl methacrylate), polycarbonate, polyethylene, or polypropylene, or a combination thereof.

The cartridge top 122 of the cartridge assembly 120 includes a housing top-facing surface that can be configured as an impingement plate. The impingement plate can be configured to disperse a mobile phase incident thereon about the cartridge assembly such as a mobile phase pumped through the mobile-phase inlet of the housing top 112 of the housing assembly 110. The impingement plate optionally includes any surface features of a number of surface features for dispersing the mobile phase incident thereon, the surface features including, for example, dimples, protrusions, channels, rails, or a combination thereof.

The outer frit 124 of the cartridge assembly 120 can include one or more channels in a housing siding-facing surface of the outer frit 124. The one or more channels can include one or more longitudinal channels 125, one or more latitudinal or circumferential channels 127, or a combination thereof. For example, the housing siding-facing surface of the outer frit 124 can include six longitudinal channels 125 and one latitudinal channel 127. FIG. 2 shows two of the six longitudinal channels 125 and one latitudinal channel 127 provided in the foregoing example. Such channels can facilitate dispersion of a mobile phase about the cartridge assembly 120.

The outer frit 124 and the inner frit 126 of the cartridge assembly 120 can be configured with a porosity sufficient for allowing a mobile phase carrying one or more components from a multi-component mixture therein to pass therethrough while restricting a stationary phase in the toroidal space 130 from passing therethrough. Such a stationary phase can include particles having an average size of no more than 50 µm, including no more than 40 µm, such as no more than 30 µm, for example, no more than 20 µm. The outer frit 124 and the inner frit 126 can be primarily formed of a same or different material selected from a metal such as stainless steel or a polymer such as poly(methyl methacrylate), polycarbonate, polyethylene, or polypropylene.

The collector 128 of the cartridge assembly 120 can be a collector rod configured to collect a mobile phase carrying one or more components from a multi-component mixture as the mobile phase passes through the inner frit 126. The collector 128 can be further configured to transport the mobile phase carrying the one or more components from the multi-component mixture to the mobile-phase outlet 115 of the housing bottom 114.

Adverting to FIG. 7A, the column 100 can be assembled in an assembly process 800A as follows:

In a first step 810 of the process 800A, a cartridge assembly 120 can be assembled for the column 100 including fixedly coupling both the outer frit 124 and the inner frit 126 to the cartridge top 122. Fixedly coupling both the outer frit 124 and the inner frit 126 to the cartridge top 122 can include welding, adhesive bonding, solvent bonding, interference fitting, or a combination thereof without mechanical compression using hardware fasteners and gaskets.

In a second step 820 of the process 800A, the housing assembly 110 for the column 100 can be assembled about the cartridge assembly 120 including fixedly coupling both the housing top 112 and the housing bottom 114 to the housing siding 116 to form the hermetic seals therebetween. Fixedly coupling to form the hermetic seals can include welding, adhesive bonding, solvent bonding, interference fitting, or a combination thereof without mechanical compression using hardware fasteners and gaskets.

In a third step 830 of the process 800A, the column 100 can be pressure tested under a hydraulic pressure to ensure the column 100 has a mechanical integrity sufficient for radial flow column chromatography pressures. The hydraulic pressure can be at least 10 psi, including at least 20 psi, such as at least 30 psi, for example, at least 40 psi to ensure the column has a mechanical integrity sufficient for radial flow column chromatography pressures.

In an example of the assembly process 800A, the cartridge top 122, the outer frit 124, the inner frit 126, and the collector 128 can be assembled and hermetically bonded via heat welding, solvent, directed energy means, or a fine interference fit. The cartridge assembly 120 can then be placed between the housing assembly components including the housing top 112, the housing bottom 114, and the housing siding 116. The housing assembly components can then be fused at their connecting faces via heat welding, solvent, or directed energy means. The strength of both sets of bonds are sufficient to ensure that a hydraulic pressure of greater than 40 psi can be easily maintained and without leakage of a stationary phase during use.

Adverting to FIG. 7B, the column 100 can be charged with a stationary phase, and a bed of the stationary phase can be packed in a charging-and-stabilizing process 800B as follows:

In a first step 840 of the process 800B, a stationary phase can be slurried in a mobile phase to form a slurry for charging the toroidal space 130 of the column 100 with the stationary phase. The slurry can be about 10-60% (w/v) of the stationary phase in the mobile phase such as 10-50% (w/v), 10-40% (w/v), or 10-30% (w/v) of the stationary phase in the mobile phase, as well as 20-60% (w/v), 20-50% (w/v), 20-40% (w/v), or 20-30% (w/v) of the stationary phase in the mobile phase. Any stationary phase of a number of stationary phases can be used, and any mobile phase of a number of mobile phases can be used. Consequently, the best concentration of the stationary phase in the mobile phase for the slurry can vary.

In a second step 850 of the process 800B, the toroidal space 130 can be charged with the stationary phase through at least one slurry inlet 117 of the column 100. Optionally, the mobile phase can be used to displace any air in the toroidal space 130 prior to charging the toroidal space 130 with the stationary phase. The toroidal space 130 can be charged with the stationary phase until a stationary phase-specific increase in hydraulic pressure is detected in the toroidal space 130. The stationary phase-specific increase in hydraulic pressure can be at least about 5 psi, including at least about 10 psi, such as at least about 20 psi, for example, at least about 30 psi or 40 psi. For example, charging the toroidal space 130 with a relatively softer or spongier stationary phase can be continued until an increase in hydraulic pressure of at least about 10-15 psi is detected in the toroidal space 130. And charging the toroidal space 130 with a relatively harder or firmer stationary phase can be continued until an increase in hydraulic pressure of at least about 30-40 psi is detected in the toroidal space. Examples of stationary phases and such charging pressures for charging the toroidal space 130 of the column 100 are provided in Table 1.

TABLE 1

Example stationary phases and charging pressures

| Stationary Phase | Charging Pressure |
|---|---|
| Cross-linked Sepharose based resins such as Fast Flow Sepharose from GE | 10-15 psi or 10-20 psi |
| MAb Select and MAb Select Sure, LX and Xtra from GE | 18-20 psi or 20-30 psi |
| Capto Sand Q, S, Q, and Adhere from GE | 18-20 psi or 20-30 psi |
| Capto ImpRes and Source Resins from GE | 25-40 psi |
| HyperD Resins from Pall | 30-40 psi |
| Fractogel Resins from Merck Millipore | 18-25 psi |
| ProSep A from Merck Millipore | 25-40 psi or 30-40 psi |
| Macroprep S and Q | |
| CHT Hydroxyapatite from BioRad | 15-22 psi |
| ProVance A from WR Grace | 30-40 psi |
| Poros HS and HQ, XS, XQ, SQ, and PI from Life Technologies | 20-30 psi or 25-40 psi |

In a third step 860 of the process 800B, a mobile-phase effluent can be collected from the mobile-phase inlet 113 of the column 100 while charging the toroidal space 130 with the stationary phase.

Adverting to FIG. 5, FIG. 5 provides a schematic illustrating charging the column 100 with a stationary phase in accordance with some embodiments. In accordance with the second step 850 and the third step 860 of the process 800B, the toroidal space 130 can be charged with the stationary phase by means of the slurry through, for example, two slurry inlets 117 of the column 100. As the stationary phase of the slurry settles and pressure builds in the toroidal space 130, excess mobile phase of the slurry can pass through the outer frit 124, along the cartridge top 122, and out the mobile-phase inlet 113 of the housing top 112 of the housing assembly 110.

In addition to the foregoing, FIG. 5 also illustrates a column-packing direction, wherein, for example, a mobile phase flows from the housing bottom 114 to a housing top 112 of the housing assembly 110.

In a fourth step 870 of the process 800B, a bed of the stationary phase in the toroidal space 130 can be stabilized by alternately pumping a mobile phase through the bed in a column-chromatography direction and a column-packing direction, optionally pumping the mobile phase through the mobile-phase inlet 113 and the mobile-phase outlet 115. Stabilizing the bed includes removing air pockets from the bed and packing the bed to a level sufficient to meet or exceed packing-efficiency specifications for the bed, thereby minimizing any dead volume. Packing-efficiency specifications can include specifications for peak asymmetry or peak asymmetry factor ("$A_s$"), height equivalent of a theoretical plate ("HETP"), or a combination thereof.

In a fifth step 880 of the process 800B, the bed of the stationary phase can be chromatographically tested with a sample analyte to ensure the bed has an integrity sufficient for radial flow column chromatography separations. Ensuring the bed has an integrity sufficient for radial flow column chromatography separations can include determining whether or not the packing-efficiency specifications for the bed have at least been met. To at least meet packing-efficiency specifications with respect to peak asymmetry, an $A_s$ can be, for example, about 0.7-1.5, wherein an $A_s$<1 indicates some peak fronting, and wherein an $A_s>1$ indicates some peak tailing. An $A_s$ of unity indicates perfect peak symmetry, and, therefore, the closer the $A_s$ is to unity the better. To at least meet packing-efficiency specifications with respect to HETP, the HETP can be, for example, about 2-4× an average particle diameter for the stationary phase of the bed thereof. For example, if the average particle diameter for particles of the stationary phase is 20 μm, the HETP can be, for example, about 40-80 μm to at least meet packing-efficiency specifications with respect to HETP.

Should the bed of the stationary phase not meet packing-efficiency specifications, the toroidal space 130 can optionally be charged with an additional amount of the stationary phase, and the bed of the stationary phase can be stabilized again. Charging the toroidal space 130 with the stationary phase and stabilizing the bed of the stationary phase can be iteratively performed until the level sufficient to meet or exceed packing-efficiency specifications is attained.

While not shown in FIG. 7B, the process 800B can further include a sixth step including sealing the at least one slurry inlet 117 of the column 100. The at least one slurry inlet 117 can be sealed subsequent to the second step 850 and the third step 860, which steps 850 and 860 can be performed concomitantly, or the at least one slurry inlet 117 can be sealed subsequent to the fourth step 870 and the fifth step 880. It will be appreciated that manufacturing equipment and processes can vary allowing the sealing to occur subsequent to any step of the foregoing steps.

While not shown in FIG. 7B, the process 800B can further include a seventh step including charging the toroidal space 130 with a bacteriostatic agent (e.g., 20% ethanol in a mobile phase such as the mobile phase of the slurry of the first step 840) before or after sealing the at least one slurry inlet 117 of the column 100. In some embodiments, the bacteriostatic agent can be included in the slurry of the first step 840 for charging the toroidal space 130 in the second step 850. In some embodiments, the bacteriostatic agent can be included in the mobile phase of the fourth step 870 for stabilizing the bed of the stationary phase in the toroidal space 130. In some embodiments, the toroidal space 130 can be charged with the bacteriostatic agent subsequent to chromatographically testing the bed of the of the stationary phase in the fifth step 880. In some embodiments, the toroidal space 130 can be charged with the bacteriostatic agent subsequent to sealing the at least one slurry inlet 117 of the column 100. In some embodiments, the toroidal space 130 can be charged with the bacteriostatic agent through the mobile-phase inlet 113 or the mobile-phase outlet 115 in a final step of the process 800B. In such embodiments, the column 100 can include a toroidal space 130 filled with the stabilized bed of the stationary phase, a nominal amount of the mobile phase, and the bacteriostatic agent such as ethanol.

In some embodiments, the charging-and-stabilizing process 800B follows on the assembly process 800A in an overall process. In consideration of the foregoing, the first step 840 of the charging-and-stabilizing process 800B can be the fourth step 840 of the overall process, the second step 850 of the charging-and-stabilizing process 800B can be the fifth step 850 of the overall process, and so on.

In an example of the charging-and-stabilizing process 800B, the column 100 can be primed by pumping a mobile phase such as a solvent or a solution (e.g., a buffer) through the mobile-phase inlet 113, the mobile-phase outlet 115, and/or the at least one slurry inlet 117 and displacing air from the toroidal space 130 of the column 100. A 20% to 50% (w/v) slurry can be prepared of the desired stationary phase in the mobile phase, and the slurry can be subsequently pumped at a flow rate of about 0.2-1 bed volumes per minute into the at least one slurry inlet 117 via positive pressure provided by a pump or pneumatic means. The stationary phase can sandwich between the outer frit 124 and the inner frit 126, and excess mobile phase can exit through the mobile-phase inlet 113 or the mobile-phase outlet 115. Once the desired level of compaction is reached for a bed of the stationary phase, the charging can be considered complete. The level of compaction can be correlated with different pressure increases for different stationary phases. Stabilization of the stationary-phase bed can be performed by alternately pumping the mobile phase in the forward and reverse directions through the column 100. The stationary-phase bed in the column 100 can be subsequently tested for integrity by running a small amount of an analyte therethrough. For example, a small amount of an analyte such as a volume of 1-3% of the volume of the stationary-phase bed, wherein the analyte is 0.1 M salt solution, vitamin B-12 solution, or acetone, can be run through the column 100. For eluent, a mobile phase commonly available for chromatography systems can be used, and for detection, conductivity or UV can be used as appropriate for the analyte. Acceptable ranges for performance of the column 100 are 0.7-1.5 for peak asymmetry and about 2-4× an average particle diameter for the stationary phase of the stationary-phase bed for a normalized HETP. FIG. 8 provides an example chromatogram for a stationary-phase bed in a column having an integrity sufficient for radial flow column chromatography separations.

Adverting to FIG. 6, FIG. 6 provides a schematic illustrating the column 100 during radial flow column chromatography in accordance with some embodiments. Subsequent to loading a multi-component mixture on the stationary phase of the column 100—which can be accomplished using, for example, a small volume of a mobile phase in which the multi-component mixture is soluble—a same or different mobile phase can be pumped into the column 100 through the mobile-phase inlet 113 of the housing top 112. If the cartridge top 122 is configured with an impingement plate, the mobile phase can interact with the impingement plate and disperse about the cartridge assembly 120 such as between the housing siding 116 and the outer frit 124, optionally through one or more channels in the housing siding-facing surface of the outer frit 124. The mobile phase can subsequently pass through the outer frit 124 and differentially partition one or more components of the multi-component mixture between the mobile phase and the stationary phase in a direction toward the inner frit 126. The mobile phase carrying the one or more components can subsequently pass through the inner frit 126, collect on the collector 128, and elute from the mobile-phase outlet 115 of the housing bottom 114. Effluent including the mobile phase and the one or more components can be collected in fractions over time resulting in separation of the one or more components from the multi-component mixture.

In addition to the foregoing, FIG. 6 also illustrates a column-chromatography direction, wherein, for example, a mobile phase flows from the housing top 112 to a housing bottom 114 of the housing assembly 110.

Devices and methods provided herein enable chromatographers to realize high-flow chromatography capabilities in a reusable, pre-packed, sealed radial-flow column that cannot be disassembled. Pre-packed columns that do not have to be packed with a stationary phase, emptied, and then packed again for reuse are desirable for their ease of use, consistent quality and results, and labor and cost savings.

Furthermore, a minimal amount of seals provides fewer opportunities for seal rupture under hydraulic pressures associated with column chromatography.

As such, provided herein in some embodiments is a column including a housing assembly and a cartridge assembly. The housing assembly can include a housing top, a housing bottom, and a housing siding. The housing siding can be fixedly coupled to the housing top and the housing bottom forming hermetic seals therebetween. The cartridge assembly can include a cartridge top, an outer frit, and an inner frit disposed within the outer frit. A toroidal space in the column can defined by the cartridge top, the outer frit, the inner frit, and the housing bottom. The toroidal space can be configured to hold a stationary phase for radial flow column chromatography.

In some embodiments, the hermetic seals are characteristic of welding, adhesive bonding, solvent bonding, interference fitting, or a combination thereof. In some embodiments, the hermetic seals are not formed by mechanical compression with hardware fasteners and gaskets. In some embodiments, the column can further include a packed bed of a stationary phase in the toroidal space for radial flow column chromatography. The toroidal space can also include a nominal amount of a mobile phase and a bacteriostatic agent (e.g. ethanol). In some embodiments, the stationary phase is a stationary phase configured for normal-phase chromatography, reverse-phase chromatography, ion-exchange chromatography, hydroxyapatite chromatography, hydrophobic interaction chromatography, or affinity chromatography. In some embodiments, the column can further include a mobile-phase inlet in a center of the housing top. In some embodiments, a housing top-facing surface of the cartridge top is configured as an impingement plate for dispersing a mobile phase pumped through the mobile-phase inlet about the cartridge assembly. In some embodiments, the outer frit includes one or more longitudinal channels, one or more latitudinal channels, or a combination thereof in a housing siding-facing surface of the outer frit for dispersing a mobile phase pumped through the mobile-phase inlet about the outer frit. In some embodiments, the column can further include a mobile-phase outlet in a center of the housing bottom. In some embodiments, the column can further include at least one slurry inlet for charging the toroidal space with a stationary phase slurried with a mobile phase.

Also provided herein in some embodiments is a column including a housing assembly and a cartridge assembly. The housing assembly can include a housing top, a housing bottom, and a housing siding. The housing top can include a mobile-phase inlet in a center of the housing top. The housing bottom can include a mobile-phase outlet in a center of the housing bottom and two slurry inlets for charging the column with a stationary phase slurried with a mobile phase. The housing siding can be fixedly coupled to the housing top and the housing bottom forming hermetic seals therebetween. The cartridge assembly can include a cartridge top, an outer frit, an inner frit disposed within the outer frit, and a collector disposed within the inner frit. A housing top-facing surface of the cartridge top can be configured as an impingement plate for dispersing a mobile phase pumped through the mobile-phase inlet about the cartridge assembly. The outer frit can includes one or more longitudinal channels, one or more latitudinal channels, or a combination thereof in a housing siding-facing surface of the outer frit for dispersing a mobile phase pumped through the mobile-phase inlet about the outer frit. A toroidal space can be defined by the cartridge top, the outer frit, the inner frit, and the housing bottom. The toroidal space can be configured to hold a packed bed of a stationary phase for radial flow column chromatography, a nominal amount of a mobile phase, and a bacteriostatic agent in the toroidal space.

In some embodiments, the hermetic seals are characteristic of welding, adhesive bonding, solvent bonding, interference fitting, or a combination thereof, and the hermetic seals are not formed by mechanical compression with hardware fasteners and gaskets.

Also provided herein in some embodiments is a process including assembling a cartridge assembly for a column, assembling a housing assembly about the cartridge assembly, and pressure testing the column. Assembling a cartridge assembly for a column can include fixedly coupling both an outer frit and an inner frit to a cartridge top. Assembling a housing assembly for the column about the cartridge assembly can include fixedly coupling both a housing top and a housing bottom to a housing siding to form hermetic seals therebetween. Optionally, the outer frit and the inner frit of the cartridge assembly can be fixedly coupled to the housing bottom of the housing assembly. Pressure testing the column can include pressure testing the column under a hydraulic pressure of at least 40 psi to ensure the column has a mechanical integrity sufficient for radial flow column chromatography pressures.

In some embodiments, fixedly coupling to form the hermetic seals can include welding, adhesive bonding, solvent bonding, interference fitting, or a combination thereof. In some embodiments, mechanical compression with hardware fasteners and gaskets is not used to form the hermetic seals. In some embodiments, the process can further include charging a toroidal space with a stationary phase through at least one slurry inlet in the housing bottom. The toroidal space can be defined by the cartridge top, the outer frit, the inner frit, and the housing bottom. In some embodiments, the process can further include slurrying the stationary phase in a mobile phase to form a slurry for charging the toroidal space with the stationary phase through the at least one slurry inlet. The slurry can be at least about 20-50% (w/v) of the stationary phase in the mobile phase. In some embodiments, charging the toroidal space with the stationary phase can be continued until a stationary phase-specific increase in hydraulic pressure of at least about 10 psi is detected in the toroidal space. In some embodiments, the process can further include collecting mobile-phase effluent from a mobile-phase inlet in the housing top while charging the toroidal space with the stationary phase. In some embodiments, the process can further include stabilizing a bed of the stationary phase in the toroidal space by alternately pumping a mobile phase through the bed in a column-chromatography direction and a column-packing direction. Stabilizing the bed can include removing air pockets therefrom and packing the bed to a level sufficient to meet or exceed packing-efficiency specifications for the bed. In some embodiments, the process can further include chromatographically testing a bed of the stationary phase with a sample analyte to ensure the bed has an integrity sufficient for radial flow column chromatography separations.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A column, comprising:
a housing assembly including
a housing top, a housing bottom, and a housing siding, wherein the housing siding is fixedly coupled to the housing top and the housing bottom forming hermetic seals therebetween;
a cartridge assembly including
a cartridge top, an outer frit, and an inner frit disposed within the outer frit, wherein the cartridge top is fixedly coupled to the outer frit and the inner frit forming seals of the cartridge assembly therebetween; and
a toroidal space defined by the cartridge top, the outer frit, the inner frit, and the housing bottom,
wherein the toroidal space is configured to hold a stationary phase for radial flow column chromatography,
wherein the hermetic seals and the seals of the cartridge assembly are characteristic of welding, adhesive bonding, solvent bonding, interference fitting, or a combination thereof,
wherein the hermetic seals and the seals of the cartridge assembly are not formed by mechanical compression with hardware fasteners and gaskets, where the column is configured to provide chromatography capabilities in a reusable, pre-packed, sealed radial-flow column that cannot be disassembled, and
wherein the housing bottom includes a mobile-phase outlet in a center of the housing bottom and two or more slurry inlets for charging the column with a stationary phase slurried with a mobile phase.

2. The column of claim 1, further comprising
a packed bed of a stationary phase in the toroidal space for radial flow column chromatography.

3. The column of claim 2,
wherein the stationary phase is a stationary phase configured for normal-phase chromatography, reverse-phase chromatography, ion-exchange chromatography, or affinity chromatography.

4. The column of claim 1, further comprising
a mobile-phase inlet in a center of the housing top.

5. The column of claim 4,
wherein a housing top-facing surface of the cartridge top is configured as an impingement plate for dispersing a mobile phase pumped through the mobile-phase inlet about the cartridge assembly.

6. The column of claim 4,
wherein the outer frit includes one or more longitudinal channels, one or more latitudinal channels, or a combination thereof in a housing siding-facing surface of the outer frit for dispersing a mobile phase pumped through the mobile-phase inlet about the outer frit.

7. A column, comprising:
a housing assembly including
a housing top, a housing bottom, and a housing siding,
wherein the housing top includes a mobile-phase inlet in a center of the housing top,
wherein the housing bottom includes a mobile-phase outlet in a center of the housing bottom and two slurry inlets for charging the column with a stationary phase slurried with a mobile phase, and
wherein the housing siding is fixedly coupled to the housing top and the housing bottom forming hermetic seals therebetween, wherein the hermetic seals are not formed by mechanical compression with hardware fasteners and gaskets, where the column is configured to provide chromatography capabilities in a reusable, pre-packed, sealed radial-flow column that cannot be disassembled;
a cartridge assembly including
a cartridge top, an outer frit, an inner frit disposed within the outer frit, and a collector disposed within the inner frit, wherein the cartridge top is fixedly coupled to the outer frit and the inner frit forming seals of the cartridge assembly therebetween, wherein the seals of the cartridge assembly are not formed by mechanical compression with hardware fasteners and gaskets,
wherein a housing top-facing surface of the cartridge top is configured as an impingement plate for dispersing a mobile phase pumped through the mobile-phase inlet about the cartridge assembly, and
wherein the outer frit includes one or more longitudinal channels, one or more latitudinal channels, or a combination thereof in a housing siding-facing surface of the outer frit for dispersing a mobile phase pumped through the mobile-phase inlet about the outer frit;
a toroidal space defined by the cartridge top, the outer frit, the inner frit, and the housing bottom; and
a packed bed of a stationary phase for radial flow column chromatography, a nominal amount of a mobile phase, and a bacteriostatic agent in the toroidal space.

8. The column of claim 7,
wherein the hermetic seals are characteristic of welding, adhesive bonding, solvent bonding, interference fitting, or a combination thereof
without an additional use of the mechanical compression with hardware fasteners and gaskets to achieve the hermetic seals.

* * * * *